Dec. 24, 1940.   R. M. NARDONE   2,225,790
ENGINE STARTING MECHANISM
Filed Feb. 15, 1939
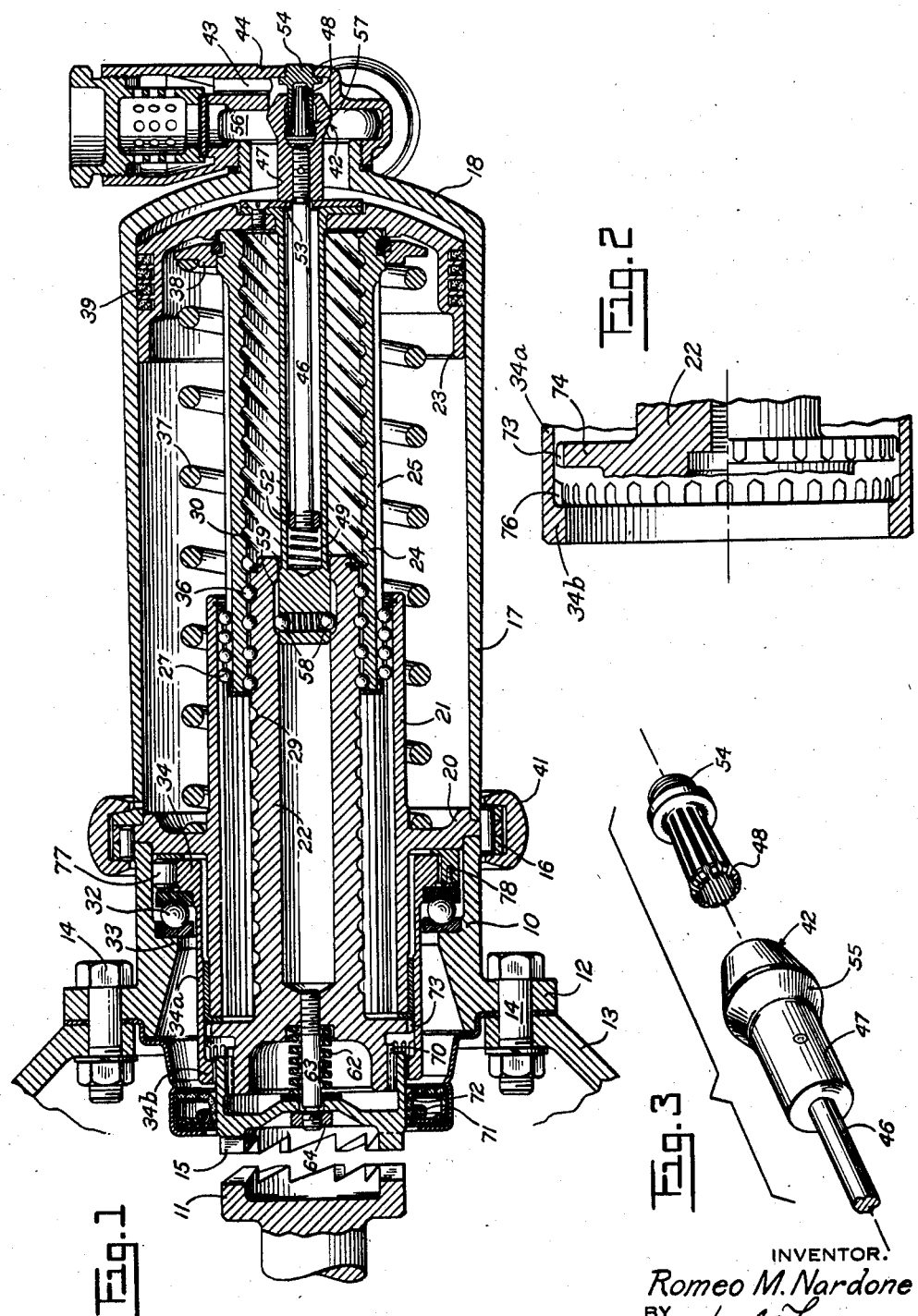
INVENTOR.
Romeo M. Nardone
BY Martin J. Finnegan
ATTORNEY.

Patented Dec. 24, 1940

2,225,790

UNITED STATES PATENT OFFICE 2,225,790

ENGINE STARTING MECHANISM

Romeo M. Nardone, East Orange, N. J., assignor to Bendix Aviation Corporation, South Bend, Ind., a corporation of Delaware Application February 15, 1939, Serial No. 256,576

7 Claims. (Cl. 123—179)

This invention relates to engine starters adapted for utilizing fluid pressure, as from air precompressed into a reservoir or from an explosive cartridge, the fluid pressure being operable upon a confined piston in the illustrated embodiment of the invention.

One of the objects of this invention is to provide a novel method of and means for protecting the starter parts from the adverse effects that might otherwise be produced by a "back-fire," or premature ignition of the engine to be started.

Another object of the invention is to provide additional improvements in the type of engine starter disclosed in my Patent No. 2,144,196 granted by the United States Patent Office on January 17, 1939, the nature and scope of which improvements are indicated in the accompanying drawing and the following particular description of one form of mechanism embodying the invention. It is to be understood, however, that the drawing is for the purpose of illustration only, and is not designed as a definition of the limits of the invention, reference being had to the appended claims for this purpose.

In the drawing,

Fig. 1 is a longitudinal sectional view of a device embodying the invention;

Fig. 2 is a fragmentary sectional view, showing certain parts of the assembly of Fig. 1, but on a slightly larger scale; and Fig. 3 is a perspective view of the valve assembly.

With reference to the drawing, and more particularly to Fig. 1, the piston actuated unit is contained within a sectional housing including cylindrical parts 17 and 10, the latter having a flange 12 by which it is secured to the engine crankcase 13 as by bolts 14, the flange being conveniently of a size standardized for aircraft engine starters. The engine crankshaft, or other drive shaft (not shown) is provided with a clutch-element 11 engageable by the piston actuated clutch-element 15 as will be later more fully described.

Cylinder 17 has a head end 18 and a crank end 20, the latter being shown as an integral part of a splined tube 21. Slidably fitted within the cylinder 17 is a piston 23 movable with a hollow internally and helically grooved screw 24 which is externally splined as at 25, to cooperate with the internally splined tube 21, a free sliding action being facilitated by provision of balls 27. A second screw 22 is drivably connected with the screw 24 by helical grooves or threads 29 and 30 which permit the axial travel of the piston 23 but cause rotation of the screw 22 because of friction reducing balls 36 inserted in the helical grooves 29 and 30. A spring 37 has one end resting against the closure plate 20 of the cylinder 17, and its opposite end abuts the thrust ring 38 which moves forward with the piston 23. Piston rings 39 insure against the loss of pressure as the piston moves forward, and also yieldably oppose rotation of the piston, even though twisting of spring 37 should occasionally cause ring 38 to rotate to some extent (the said ring 38 having a running fit about screw 24).

Due to the bolted split clamp connection 41 between the cylinder 17 and the body flange 16, the former may be quickly detached for removing any fouling that may occur where combustible cartridges are used as the source of fluid pressure to move the piston 23.

By reason of the action of spring-pressed balls 58 upon recess 59 in sleeve 22, the initial axial movement of the piston 23 will be transmitted to said sleeve 22, and the resultant axial thrust will be yieldably imparted to clutch jaw 15 through a compressible spring 62 mounted on a rod 63 having at its outer end a nut 64 permitting adjustment of the action of spring 62. Upon resistance to axial travel (as by collision of the tooth corners) spring 62 will permit the continued advance of sleeve 22 under the urge of the balls 58 thereupon. Meanwhile the action of the threads 29, 30 will produce sufficient rotation of sleeve 22 and hence of clutch jaw 15, splined thereto, to relieve the condition of corner tooth contact, whereupon spring 62 becomes effective to complete the "meshing" (engaging) action. During this operation toroidal spring 71 exerts a radially directed pressure, through leather sealing gasket 72, upon the jaw 15, producing a friction which prevents too rapid rotation of the member 15 prior to complete meshing, and hence tends to accelerate complete meshing, as well as to insure a tight sealing of the unit against seepage of oil from the engine crankcase along the surface of the jaw 15, and into the starting apparatus. An anti-friction thrust bearing 32 is preferably interposed between a flanged skirt or rim 34 on rear end of spacer 34a and an inwardly extending circular rim 33 of the cylindrical part 10. The inwardly extending rim 34b on the forward end of spacer 34a takes the thrust as jaw 15 rides into mesh with engine member 11.

For protection of the starter against "backfire" effects the invention includes the concept of locking the starter assembly against reverse rotation while jaws 15 and 11 are inter-engaged. As shown, the locking action involves teeth 73 (shown best in Fig. 2) on the periphery of the circular flange or shoulder 74 located slightly to the rear of splines 70 of the sleeve 22. The locking action further involves teeth 76 cut internally of spacer 34a, adjacent the forward rim 34b thereof, and spaced to correspond to the spacing of teeth 73; both sets of teeth (73 and 76) being chamfered at their adjacent ends to facilitate their inter-engagement as sleeve 22 moves forward at the beginning of the cranking operation. The locking action additionally involves a set of rollers 77 disposed about the periphery of rim 34 of spacer 34a, and adapted to roll freely upon the inner surface of housing 10 during the normal cranking operation, but acting as locking elements to prevent rotation in the opposite direction in the event of a reverse rotational impulse, such as may be caused by a "back-fire," that is, a premature explosion in one of the cylinders of the engine being started. To produce such unidirectional action the rim 34 of spacer 34a is notched in the manner of the inner race of a conventional uni-directional roller clutch (see Fig. 3 of my Patent No. 2,003,456) and the rollers 77, with or without spring biasing means, are inserted in such notches, and retained in properly spaced relationship by the cage 78.

With the arrangement of parts as just described, it will be apparent that in the event of a "back-fire" with parts 15 and 11 engaged, the rollers 77 will hold spacer 34a from rotating in a direction opposite to the normal cranking direction, and the inter-engaging teeth 73, 76 will concurrently act to prevent reverse rotation of sleeve 22 and clutch element 15. Thus both the engine and starter will be held against a reversal of rotation so long as the said two units are coupled in cranking relationship, wherefore rotation in the forward (cranking) direction will be resumed under the continuing impetus of the incoming pressure fluid upon piston 23. During such continued cranking operation the rollers 77 again permit free over-running of spacer 34a.

After the engine becomes sufficiently self-operative to accelerate engine member 11 to a speed in excess of that of the starter, the member 15 is cammed rearwardly, and the concurrent or subsequent return stroke of piston 23 (under the impetus of the now re-expanding spring 37, the action of which is more fully described hereinafter) carries along the members 24, 22, 63, 64 and 15 therewith, whereupon the teeth 73 are freed from the teeth 76, and the driven screw 22 is thus made free to rotate in the reverse direction under the motion translating action of the backwardly moving driving screw 24.

The present invention also includes improved means for automatically controlling the exhaust of the fluid pressure from the cylinder upon completion of each operation. This exhaust control may be effected by providing an exhaust valve 42 adapted to cooperate with an exhaust port 43 conveniently formed in the housing 44, and communicating with an exhaust connection (not shown) leading to any desired point. In the case of an airplane, for example, this exhaust connection will lead to a point exteriorly of the fuselage. The valve 42 is carried by a stem 46 which is of such a length that with the piston in the position indicated in Figure 1, a spring 49 will bear against an enlarged head 52 on the stem 46 to hold valve 42 closed, until such time a fluid under pressure is admitted to act upon the head portion of the valve 42, and thereby assist the spring 49 in maintaining the said exhaust valve 42 closed; but as the piston nearly reaches the end of its forward movement, a collar 53 extending inwardly of piston 23 and surrounding the stem 46 will be brought into engagement with the head 52, and will be effective to unseat the exhaust valve 42. The exhaust valve having been unseated in the manner described, the fingered catch 48 (Figs. 1 and 3) will cooperate with the internally formed circular bead 51 of valve 42 for yieldably holding said valve in open position, its maximum opening movement being likewise limited by the restraining action of the fingers of said element 48. The neck-portion 54 of catch 48 is externally threaded, as shown, for adjustably positionable retention in the housing 44.

The piston having completed its operative stroke, and the exhaust valve having been opened, the piston will be urged on its return stroke by the coil spring 37. During this return movement, the exhaust valve being held open, the cylinder will be effectively scavenged. Due to the action of the catch 48 the valve will remain open until such time as the piston collar 53 is brought to bear against the valve stem 47 for again seating the valve. This insures closing movement of the valve at the time the piston has substantially completed its return movement, the closing being initiated and assisted by the action of the spring means 49 above described. There is thus provided automatically controlled exhaust means, which exhaust means is of such construction as to remain open during the major portion of the return stroke of the piston so as to aid attainment of substantially complete scavenging; moreover, the "streamlining" of the valve surface, as indicated at 55 (Fig. 3) tends to accelerate the exhaust flow and thus provides an added assurance of complete scavenging.

What I claim is:

1. In an engine starter of the type in which the engine-engaging member moves axially forward to engine-engaging position and axially backward to the disengaged position when the engine starts, means for rotating said engine-engaging member in one direction while in engine-engaging position, said means including a driving part having splines constantly interlocked with splines on said engine-engaging member, said driving part also having teeth disposed rearwardly of said engine-engaging member, means engageable with said teeth to lock both said driving part and said engine-engaging member against reverse rotation while the engine-engaging member is in engine-engaging position, and means for shifting said part rearwardly to free said teeth from engagement by said locking means and simultaneously hold said engine-engaging member in the disengaged position.

2. In an engine starter of the type in which the engine-engaging member moves axially forward to engine-engaging position and axially backward to the disengaged position when the engine starts, means for rotating said engine-engaging member in one direction while in engine-engaging position, said means including a driving part having splines constantly interlocked with splines on said engine-engaging member, said driving part also having teeth disposed rearwardly of said engine-engaging member, means engageable with said teeth to lock both said driving part and said engine-engaging member against reverse rotation while the engine-engaging member is in engine-engaging position, and means for shifting said part rearwardly to free said teeth from engagement by said locking means and simultaneously hold said engine-engaging member in the disengaged position, said last-named means including a reciprocable screw element telescopically connected to said driving part and constituting the actuating means therefor.

3. In an engine starter of the type in which the engine-engaging member moves axially forward to engine-engaging position and axially backward to the disengaged position when the engine starts, means for rotating said engine-engaging member in one direction while in engine-engaging position, said means including a driving part having splines constantly interlocked with splines on said engine-engaging member, said driving part also having teeth disposed rearwardly of said engine-engaging member, means including a unidirectional clutch assembly having its inner race engageable with said teeth to lock both said driving part and said engine-engaging member against reverse rotation while the engine-engaging member is in engine-engaging position, means for shifting said part rearwardly to free said teeth from engagement by the inner race of said clutch assembly, and means for securing the outer race of said clutch assembly to prevent rotation thereof in either direction.

4. In an engine starter of the type in which the engine-engaging member moves axially forward to engine-engaging position and axially backward to the disengaged position when the engine starts, means for driving said engine-engaging member, said means including a driving part having limited axial as well as rotary movement, means for preventing rotation of said driving part in more than a single direction so long as said driving part is at the forward limit of its axial movement, and means for shifting said part rearwardly to free said part from the restraint of said preventing means.

5. In an engine starter of the type in which the engine-engaging member moves axially forward to engine-engaging position and axially backward to the disengaged position when the engine starts, means for driving said engine-engaging member, said means including a driving part having limited axial as well as rotary movement, means for preventing rotation of said driving part in more than a single direction so long as said driving part is at the forward limit of its axial movement, and means for shifting said part rearwardly to free said part from the restraint of said preventing means, said means further acting to hold said engine-engaging member in the disengaged position.

6. In an engine starter of the type in which the engine-engaging member moves axially forward to engine-engaging position and axially backward to the disengaged position when the engine starts, means for driving said engine-engaging member, said means including a driving part having limited axial as well as rotary movement, means for preventing rotation of said driving part in more than a single direction so long as said driving part is at the forward limit of its axial movement, and means for shifting said part rearwardly to free said part from the restraint of said preventing means, said last-named means including a reciprocable screw element telescopically connected to said driving part and constituting the actuating means therefor.

7. In an engine starter of the type in which the engine-engaging member moves axially forward to engine-engaging position and axially backward to the disengaged position when the engine starts, means for driving said engine-engaging member, said means including a driving part having limited axial as well as rotary movement, means for preventing rotation of said driving part in more than a single direction so long as said driving part is at the forward limit of its axial movement, and means for shifting said part rearwardly to free said part from the restraint of said preventing means, said means further acting to hold said engine-engaging member in the disengaged position, said last-named means including a reciprocable screw element telescopically connected to said driving part and constituting the actuating means therefor.

ROMEO M. NARDONE.